United States Patent [19]
de Goncourt et al.

[11] Patent Number: 4,854,606
[45] Date of Patent: Aug. 8, 1989

[54] VEHICLE SUSPENSION ASSEMBLY

[75] Inventors: Louis de Goncourt, Voisins-le-Bretonneux; Kenneth H. Sayers, Rambouillet, both of France

[73] Assignee: Bertin & CIE, Plaisir, France

[21] Appl. No.: 162,332

[22] PCT Filed: Jun. 11, 1987

[86] PCT No.: PCT/FR87/00211
§ 371 Date: Feb. 16, 1988
§ 102(e) Date: Feb. 16, 1988

[87] PCT Pub. No.: WO87/07564
PCT Pub. Date: Dec. 17, 1987

[30] Foreign Application Priority Data
Jun. 16, 1986 [FR] France .................. 86 08639

[51] Int. Cl.$^4$ .................................................. B60G 3/00
[52] U.S. Cl. ...................................... 280/699; 280/719
[58] Field of Search ..................... 280/699, 719, 720

[56] References Cited
U.S. PATENT DOCUMENTS

| | | | |
|---|---|---|---|
| 2,697,613 | 12/1954 | Giacosa | 280/719 |
| 2,819,768 | 1/1958 | Barenyi | 280/719 |
| 4,557,500 | 12/1985 | Collard et al. | 280/719 |

FOREIGN PATENT DOCUMENTS

| | | | |
|---|---|---|---|
| 189241 | 7/1986 | European Pat. Off. | 280/699 |
| 87/02316 | 4/1987 | PCT Int'l Appl. | 280/719 |
| 93136 | 3/1922 | Switzerland | 280/699 |

Primary Examiner—Charles A. Marmor
Assistant Examiner—Ross Weaver
Attorney, Agent, or Firm—A. W. Breiner

[57] ABSTRACT

Suspension assembly consisting of a bearing structure capable of being fixed to the chassis of a vehicle. The structure holds the composite leaf spring in position to the ends of which the wheel supports are fixed. The supports are connected to the structure by the wishbones and the shock absorbers. Different positions of the composite leaf spring, wishbones and shock absorbers are described.

7 Claims, 2 Drawing Sheets

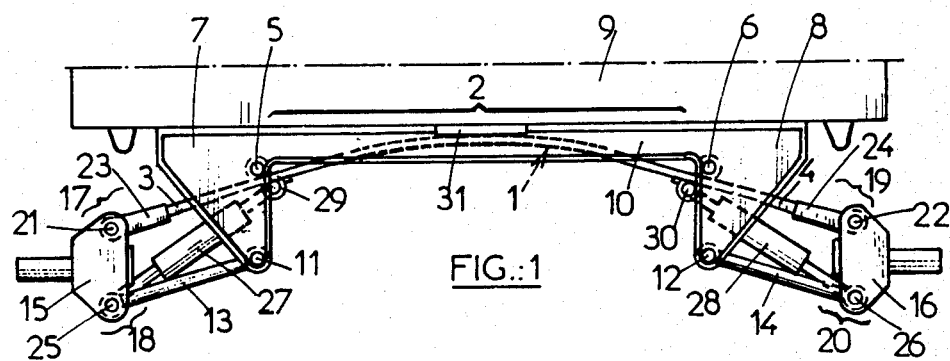
FIG.:1
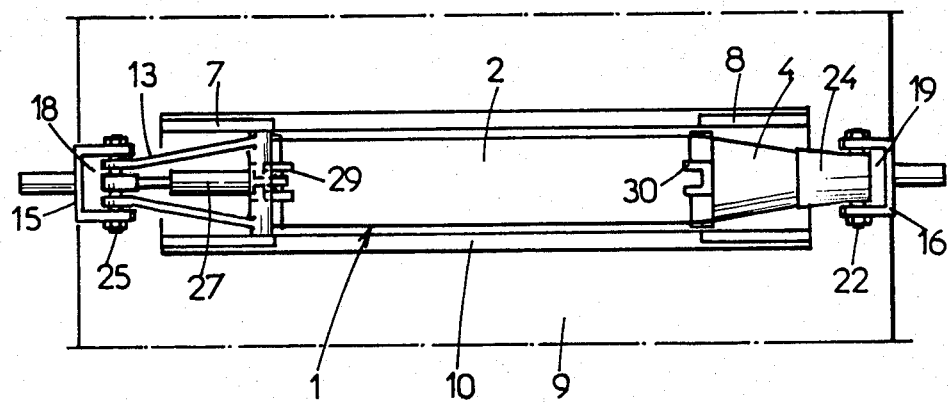
FIG.:2

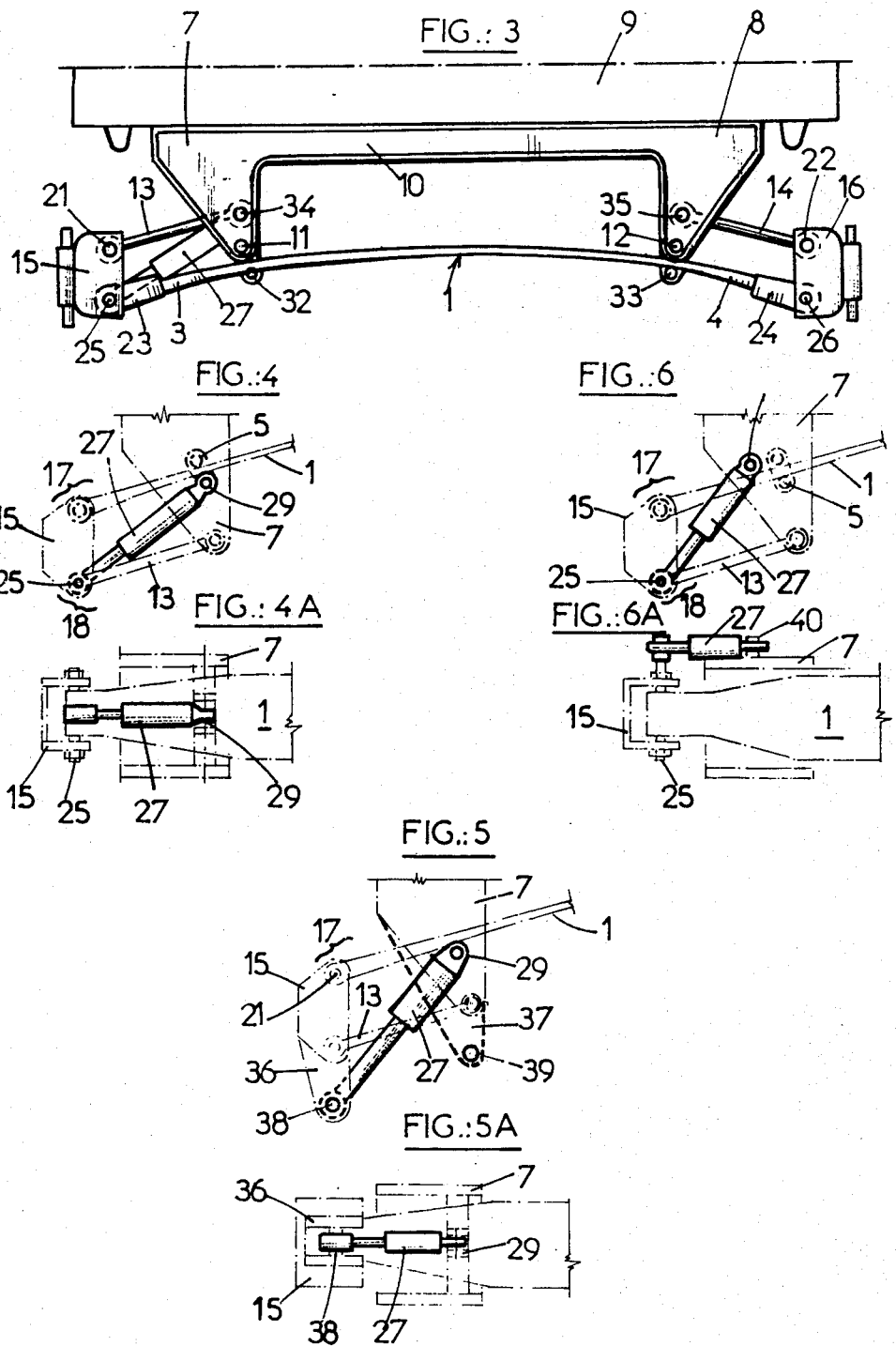

VEHICLE SUSPENSION ASSEMBLY

The invention relates to a vehicle suspension assembly with a transverse composite leaf spring comprising a composite leaf spring having a developing profile of increasing thickness and of decreasing width towards its ends, a wheel support connected on the one hand to the spring and on the other hand to the chassis by a wishbone or connecting arm, a shock absorber unit being provided between the wheel support and the body for damping the amplitudes.

An automobile suspension with a composite leaf spring is known, for example, from French Pat. No. 2,516,455, corresponding to U.S. Pat. No. 4,557,500. This spring is placed transversely under the chassis of a vehicle to which it is held in position by connecting components, symmetrically in relation to the axis of the vehicle. As a result of the particular features of the spring, obtained not only due to its shape but also due to its method of manufacture, it has been possible to abolish the coil springs of the shock-absorbing device ensuring the vertical return of the vehicle to its static position and to lighten or eliminate the wishbones connecting the wheel supports to the chassis, which transmit the braking forces and ensure the geometric positioning of the wheel axis. The shock-absorbing device is thus reduced to a damping strut only, ensuring the vertical guidance of the wheel axis and the damping of amplitude.

The attitude adopted by the composite springs in the working position is appreciably different from that which they adopt when they are under no stress whatsoever. The springs are more or less curved sharply in their plane of longitudinal symmetry and, when fitting them to a front or rear axle of a car, they need to be set up in order to be able to fix them to the connecting devices on the chassis and to the wheel supports. Tooling enabling a preload to be applied to the spring for its setting up is known and is used for fitting the springs to and removing them from the suspension components already fitted on the vehicle.

The location of the axles and the preload which must be applied to the coil spring or to the leaf spring do not allow an improvement of assembly times on production lines or during repair or maintenance work.

The subject of the present invention is a suspension assembly comprising a bearing structure, capable of being fixed to the chassis which holds the leaf spring in position to the ends of which are fixed the wheel supports, the said supports being themselves connected to the said structure by wishbones or connecting arm and shock absorbers.

The bearing structure consists of two mountings, connected at least provisionally by a beam, in which the leaf spring, wishbones and shock absorbers are held in position.

The explanations and figures given hereinafter as examples enable an understanding of how the invention may be embodied.

FIG. 1 is a front view of a first exemplary embodiment of a suspension according to the invention.

FIG. 2 is a view form below of figure 1 in which the wishbone and the shock absorber have been removed on the right-hand side of the drawing to show the fixing of the spring.

FIG. 3 is a front view of a second exemplary embodiment of a suspension according to the invention.

FIGS. 4, 4A; 5, 5A; 6, 6A show three examples of the shock absorber layout in relation to the spring and to the wishbones or connecting arm.

FIGS. 1 and 2 show an automobile suspension with a composite leaf spring 1, viewed respectively from the front and from underneath. As is known, this spring has a central part 2, of relatively thin and wide rectangular section united at its ends to parts 3, 4 having a developing profile of increasing thickness and decreasing width. This spring is held in position in connecting devices 5, 6 provided in the mountings 7, 8 constituting the bearing structure fixed to the chassis 9 of the vehicle.

According to the embodiment shown, the mountings 7, 8 are in the form of a "U" section with triangular sides. These mountings are fixed to or are an integral part of a frame in the shape of a beam 10 ensuring their positioning and bearing the preload stresses applied to the spring.

According to an embodiment not shown, the frame is made up of two removable beams fastened to the sides of the mountings so as to be able to be withdrawn after the said mountings have been fixed to the chassis.

The mountings are also fitted with bearings in which the pins 11, 12, around which the bottom of the wishbones or connecting arms 13, 14 turns, are inserted.

The wheel supports 15, 16 are held in position at the ends of the spring blade and at the apex of the wishbones. These supports each have two yokes 17, 18 and 19, 20 in which bearings of parallel pins are provided. The bearings of one of the yokes 17, 19 accept pins 21, 22 which interact with the brackets 23, 24 provided at the ends of the leaf spring, those of the other yoke 18, 20 accept a pin 25, 26 interacting with the apex of the wishbones or connecting arms 13, 14 and possibly with the shock absorber rod 27, 28 the body of which is hinged on the means of holding in position 29, 30 formed by a yoke provided in the mountings 7, 8.

The exemplary embodiment in FIG. 1 is intended more particularly for the rear suspension of a vehicle and in consequence has stub axles on a horizontal axis. Furthermore, the leaf spring is located above the wishbones or connecting arms and is proteced from projections due to its distance from the road surface. Also as shown in FIG. 1, parts 3, 4 and connecting arms 13, 14 form parallelograms with mountings 7, 8 and wheel supports 15, 16.

In the case of mountings integral with a "U" section beam, the sides of the "U" enable part of the blade at least to be boxed in. Possibly a stop 31 is provided on the center part at the back of the beam 10.

The preceding embodiment, with a leaf spring at the top, may be used for a rear axle and is particularly interesting in the case where it is desired to have sufficient space available for locating a spare wheel, for example.

In the exemplary embodiment shown in FIG. 3, similar components to those described in the preceding example bear the same reference numbers. The differences concern mainly the relative positions of the wishbones and the leaf spring. The spring is now in the bottom position and the devices connecting the blade to the mountings are at the bottom end of the mountings at 32, 33, the fixings for the bottoms of the wishbones 13, 14 being moved up to 34, 35 approximately in the position of the connecting devices for the spring in the proceding example.

Also shown on this example are wheel supports in the form of vertical stub axles such as those which are found on certain front axles for utility vehicles and trucks, for example.

The shock absorbers 27, 28 are located, in this exemplary embodiment, approximately between the ends of the brackets 23, 24 for the spring 1 and the pin 34, 35 around which the bottoms of the wishbones 13, 14 pivot.

This same layout of the shock absorbers may be adopted in the example for FIGS. 1 and 2 and inversely the layout of the shock absorbers according to the example in FIG. 3 may be adopted for FIGS. 1 and 2.

The shock absorbers are in the vertical symmetrical plane of the suspension assembly as shown in FIGS. 4, 4A. They are thus held in position at one of their ends by one of the pins holding the wishbone 13, 14 in position and at the other end by a pin held in position in a yoke fixed either on the mountings 7, 8 or held in position by the pin for the brackets 23, 24 of the spring 1.

According to the example of the layout shown in FIGS. 5, 5A, and showing only one side of the suspension, the other side being identical, an extension 36 (or 37 shown in dotted lines) of the bottom part of the wheel support 15 (or of the mounting 7) having a pin 38 (or 39), is provided, in which one end of the shock absorber 27 is fitted, the other end being held in position in a yoke 29 provided on the mounting 7 (or on the pin 21 of the yoke 17 for the wheel support 15).

The example of FIGS. 6, 6A shows an embodiment in which the shock absorbers 27 are arranged in a plane parallel to the symmetrical plane of the suspension assembly and external to the said assembly.

This layout may be used in the example in FIGS. 5, 5A with the bottom extension 36 or 37 of the wheel support or of the mounting.

One end of the shock absorber 27 is fitted on an external extension of the pin 25 whereas the other end of the shock absorber pivots around a pin 40 forming a means of retention bearing against one of the sides of the mounting 7.

The different examples described earlier enable the suspension to be adapted to the different problems which may arise depending on the types of vehicle to which it is desired to fit it.

The top of bottom position of the leaf spring may be chosen depending on space requirements for, for example, a spare wheel (top spring) or an engine sump (bottom spring). It is just the same for the position of the shock absorbers in the plane parallel to the symmetrical plane of the suspension.

We claim:

1. A vehicle suspension assembly including a transverse leaf spring, two symmetrically spaced mountings, two wheel supports and two rigid connecting arms, said leaf spring contructed and arranged for connection to a vehicle frame with said two symmetrically spaced mountings and being pivoted at its opposite ends to said two wheel supports respectively, and said two rigid connecting arms extending parallely to opposed outer portions of said leaf spring and operatively pivoted to the vehicle frame and wheel supports respectively, wherein said leaf spring is made of unidirectional composite material of constant cross-sectional area, the thickness and the width of each outer portion of which increases and decreases respectively from each of said mountings towards the respective end of said leaf spring, whereby said end portion is rigid and constitutes a deformable parallelogram together with the corresponding connecting arm and wheel support, and wherein a shock absorber is operatively mounted substantially diagonally between opposite ends of said connecting arm and outer portion of said leaf spring of said deformable parallelogram.

2. A vehicle suspension according to claim 1 wherein said outer portion of said leaf spring and said connecting arm have substantially the same operative length between the wheel support and the vehicle frame.

3. A vehicle suspension according to claim 2 wherein said connecting arm includes a pair of connecting rods encompassing said shock absorber.

4. A vehicle suspension according to claim 3 wherein said shock absorber is operatively mounted between the mounting of said leaf spring and the diagonally opposite end of said rods.

5. A vehicle suspension according to claim 3 wherein said shock absorber is respectively mounted between the end of said leaf spring and the diagonally opposite end of said rods.

6. A vehicle suspension according to claim 3 wherein the outer end of said shock absorber is pivoted on an extension of said wheel support.

7. A vehicle suspension according to claim 3 wherein the mountings of said leaf spring and the pivoted arm end of said connecting rods and shock absorber are carried by a rigid structure to constitute an integral suspension assembly to be secured under the vehicle frame.

* * * * *